(12) United States Patent
Wen et al.

(10) Patent No.: US 11,008,440 B2
(45) Date of Patent: May 18, 2021

(54) FLAME RETARDANT PROPYLENE COMPOSITION

(71) Applicant: SABIC GLOBAL TECHNOLOGIES B.V., Bergen op Zoom (NL)

(72) Inventors: Liang Wen, Geleen (NL); Benoit Lecouvet, Geleen (NL); Chaodong Jiang, Geleen (NL); Azzedine Kioul, Geleen (NL); Saad Alhussain, Geleen (NL); Faisal Al Suhaibani, Geleen (NL); Jun Zhou, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 33 days.

(21) Appl. No.: 16/320,228

(22) PCT Filed: Jul. 24, 2017

(86) PCT No.: PCT/EP2017/068630
§ 371 (c)(1),
(2) Date: Jan. 24, 2019

(87) PCT Pub. No.: WO2018/019762
PCT Pub. Date: Feb. 1, 2018

(65) Prior Publication Data
US 2019/0264002 A1    Aug. 29, 2019

(30) Foreign Application Priority Data
Jul. 28, 2016    (CN) .......................... 201610607564.0

(51) Int. Cl.
| | | |
|---|---|---|
| C08K 13/02 | (2006.01) | |
| C08K 3/32 | (2006.01) | |
| C08K 5/523 | (2006.01) | |
| C08L 23/12 | (2006.01) | |
| C09K 21/12 | (2006.01) | |
| C09K 21/04 | (2006.01) | |
| C08K 5/3462 | (2006.01) | |
| C08K 5/3492 | (2006.01) | |
| C08K 5/49 | (2006.01) | |
| C08K 5/00 | (2006.01) | |
| C08K 3/016 | (2018.01) | |

(52) U.S. Cl.
CPC .............. *C08K 5/3462* (2013.01); *C08K 3/32* (2013.01); *C08K 5/34928* (2013.01); *C08K 5/49* (2013.01); *C08K 5/523* (2013.01); *C08K 13/02* (2013.01); *C08L 23/12* (2013.01); *C09K 21/04* (2013.01); *C09K 21/12* (2013.01); *C08K 3/016* (2018.01); *C08K 5/0066* (2013.01); *C08K 2003/321* (2013.01); *C08K 2003/323* (2013.01); *C08K 2201/014* (2013.01); *C08L 2201/02* (2013.01)

(58) Field of Classification Search
CPC ........ C08K 3/32; C08K 5/3462; C08K 5/523; C08K 13/02; C08L 23/12; C09K 21/12; C09K 21/04
USPC ....................................................... 524/100
See application file for complete search history.

(56) References Cited

U.S. PATENT DOCUMENTS

| | | |
|---|---|---|
| 4,399,054 A | 8/1983 | Ferraris et al. |
| 4,472,524 A | 9/1984 | Albizzati |
| 4,579,894 A | 4/1986 | Bertelli et al. |
| 7,465,761 B2 | 12/2008 | Murase et al. |
| 9,856,420 B2 | 1/2018 | Kim et al. |
| 10,167,384 B2 | 1/2019 | Herklots |
| 2005/0142371 A1 | 6/2005 | Swain |
| 2009/0054565 A1* | 2/2009 | Eisentraeger ........... C08L 23/10 524/100 |
| 2010/0227952 A1* | 9/2010 | Futterer ............. C08K 5/34928 524/13 |
| 2011/0065845 A1* | 3/2011 | Papazoglou ............ C08L 23/10 524/101 |
| 2011/0144244 A1* | 6/2011 | Lee .......................... C08L 23/06 524/84 |
| 2012/0322923 A1* | 12/2012 | Wermter .............. C08K 5/0066 524/100 |
| 2015/0232652 A1* | 8/2015 | Herklots .................. C08K 5/52 524/229 |

FOREIGN PATENT DOCUMENTS

| | | |
|---|---|---|
| CN | 1602334 A | 12/2001 |
| CN | 1432045 A | 7/2003 |
| CN | 101168607 A | 4/2008 |
| CN | 101654864 A | 9/2009 |
| CN | 105255016 A | 1/2016 |
| EP | 2915845 A1 | 9/2015 |
| JP | 2000160031 A | 6/2000 |
| WO | 8505626 A1 | 12/1985 |
| WO | 2006010414 A1 | 2/2006 |
| WO | WO-2015088170 A1 * | 6/2015 .............. C08L 23/12 |

* cited by examiner

*Primary Examiner* — Deve V Hall
(74) *Attorney, Agent, or Firm* — Cantor Colburn LLP

(57) ABSTRACT

The invention relates to a flame retardant polypropylene composition comprising (A) a polypropylene-based polymer, (B) a first flame retardant in an amount of 15 to 40 wt % of the total composition, wherein the first flame retardant is in the form of particles comprising ammonium polyphosphate and at least one phosphate selected from the group consisting of melamine phosphate, melamine polyphosphate, melamine pyrophosphate, piperazine phosphate, piperazine polyphosphate, piperazine pyrophosphate, 2-methylpiperazine monophosphate, tricresyl phosphate, alkyl phosphates, haloalkyl phosphates, tetraphenyl pyrophosphate, poly(2-hydroxy propylene spirocyclic pentaerythritol bisphosphate) and poly(2,2-dimethylpropylene spirocyclic pentaerythritol bisphosphonate) and (C) a second flame retardant in an amount of 0.1 to 15 wt % of the total composition, wherein the second flame retardant comprises an aromatic phosphate ester.

15 Claims, No Drawings

FLAME RETARDANT PROPYLENE COMPOSITION

CROSS REFERENCE TO RELATED APPLICATIONS

This application is a 371 of International Application No. PCT/EP2017/068630, filed Jul. 24, 2017, which is incorporated herein by reference in its entirety, and which claims priority to CN Application Serial No. 201610607564.0, filed Jul. 28, 2016.

The invention relates to a flame retardant composition comprising a propylene-based polymer, to a process for obtaining such composition, to the use of such composition and an article comprising such composition.

In order to improve the flame retardancy performance of polypropylene (PP), a flame retardant (FR) is usually added to the PP. It has been suggested that highly toxic brominated dibenzodioxines and dibenzofurans may be formed during burning of some currently used brominated FR additives. Therefore, more and more applications require non-bromine FR solutions. Nowadays, intumescent flame retardant (IFR) is widely used. WO1985005626 discloses an IFR containing ammonium polyphosphate, melamine phosphate and pentaerythritol. However, due to high price and high loading of IFR, the cost of the PP compositions is high. Further, a high loading of IFR usually decreases the mechanical properties.

U.S. Pat. No. 7,465,761 discloses a flame retardant composition obtained from a salt of piperazine and an inorganic phosphorus compound; a salt of melamine and an inorganic phosphorus compound, to which a silicone oil is added and treated.

EP2915845 discloses a polyolefin-based flame retardant resin composition comprising polypropylene and a phosphate-based flame retardant, the phosphate-based flame retardant comprising a solid phase phosphate flame retardant and a liquid-type phosphate ester flame retardant. The composition may further comprise a surface-modified fluorine resin powder.

There is a demand in the art for a flame retardant propylene composition which is easy to process and which has good flame retardant properties and mechanical properties.

It is an objective of the present invention to provide a flame retardant propylene composition in which the above-described and/or other needs are met.

Accordingly, the present invention provides a flame retardant polypropylene composition comprising (A) a polypropylene-based polymer, (B) a first flame retardant in an amount of 15 to 40 wt % of the total composition, wherein the first flame retardant is in the form of particles comprising ammonium polyphosphate and at least one phosphate selected from the group consisting of melamine phosphate,
melamine polyphosphate,
melamine pyrophosphate,
piperazine phosphate,
piperazine polyphosphate,
piperazine pyrophosphate,
2-methylpiperazine monophosphate,
tricresyl phosphate,
alkyl phosphates,
haloalkyl phosphates,
tetraphenyl pyrophosphate,
poly(2-hydroxy propylene spirocyclic pentaerythritol bisphosphate) and
poly(2,2-dimethylpropylene spirocyclic pentaerythritol bisphosphonate) and (C) a second flame retardant in an amount of 0.1 to 15 wt % of the total composition, wherein the second flame retardant comprises an aromatic phosphate ester.

The flame retardant present in the polypropylene composition according to the invention consists of the first flame retardant and the second flame retardant. It was surprisingly found that the use of the specific combination of the flame retardants in the composition according to the invention leads to a good flame retardancy and a high melt flow rate which allows good processability.

(A) Polypropylene-Based Polymer

Homopolymer and Non-Heterophasic Copolymer

The polypropylene-based polymer may be a propylene homopolymer or a propylene α-olefin copolymer including random copolymers and (multi)block copolymers. The copolymer is preferably a random copolymer. The copolymer may consist of at least 70 wt % of propylene and up to 30 wt % of α-olefin, based on the total weight of the copolymer. Preferably, the α-olefin in the propylene-α-olefin copolymer is selected from the group of α-olefins having 2 or 4-10 carbon atoms, for example ethylene, 1-butene, 1-pentene, 4-methyl-1-pentene, 1-hexen, 1-heptene or 1-octene, preferably ethylene.

The amount of the α-olefin in the propylene α-olefin copolymer is preferably 1-15 wt %, more preferably 1-10 wt %, more preferably 1-6 wt %, more preferably 1-4 wt %.

Preferably, the propylene α-olefin copolymer is a propylene-ethylene random copolymer wherein the amount of ethylene is 1-15 wt %, more preferably 1-10 wt %, more preferably 1-6 wt %, more preferably 1-4 wt % based on the total weight of the propylene-based polymer.

The MFI of some preferred propylene homopolymer or propylene α-olefin may be for example at least 10 dg/min, at least 20 dg/min. at least 30 dg/min or at least 40 dg/min and/or at most 100 dg/min, at most 80 dg/min, at most 60 dg/min or at most 50 dg/min measured according to ISO1133 (2.16 kg/230° C.).

Heterophasic Propylene Copolymer

The polypropylene-based polymer may be a heterophasic propylene copolymer. Heterophasic propylene copolymers, also known as impact propylene copolymers or propylene block copolymers, are an important class of polymers due to their attractive combination of mechanical properties, such as impact strength over a wide temperature range and their low cost. These copolymers find a wide range of applications ranging from the consumer industry (for example packaging and housewares), the automotive industry to electrical applications.

Heterophasic propylene copolymers are generally prepared in one or more reactors, by polymerization of propylene in the presence of a catalyst and subsequent polymerization of a propylene-α-olefin mixture. The resulting polymeric materials are heterophasic, but the specific morphology usually depends on the preparation method and monomer ratios used.

The heterophasic propylene copolymers employed in the process according to present invention can be produced using any conventional technique known to the skilled person, for example multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; *Polypropylene and other Polyolefins*, by Ser van der Ven, Studies in Polymer Science 7, Elsevier 1990; WO06/010414, U.S. Pat. Nos. 4,399,054 and 4,472,524. Preferably, the heterophasic propylene copolymer is made using Ziegler-Natta catalyst.

The heterophasic propylene copolymer may be prepared by a process comprising polymerizing propylene and optionally α-olefin in the presence of a catalyst system to obtain the propylene-based matrix and subsequently polymerizing ethylene and α-olefin in the propylene-based matrix in the presence of a catalyst system to obtain the dispersed ethylene-α olefin copolymer.

These steps are preferably performed in different reactors. The catalyst systems for the first step and for the second step may be different or same.

The heterophasic propylene copolymer of the composition of the invention consists of a propylene-based matrix and a dispersed ethylene-α-olefin copolymer. The propylene-based matrix typically forms the continuous phase in the heterophasic propylene copolymer. The amounts of the propylene-based matrix and the dispersed ethylene-α-olefin copolymer may be determined by $^{13}$C-NMR, as well known in the art.

The propylene-based polymer may be one type of heterophasic propylene copolymer or a mixture of different types of heterophasic propylene copolymers, e.g. a mixture of a first type of a heterophasic propylene copolymer and a second type of heterophasic propylene copolymer at any weight ratio, e.g. 1:99-99:1 or 50:50.

The heterophasic propylene copolymer consists of (a) a propylene-based matrix, wherein the propylene-based matrix consists of a propylene homopolymer and/or a propylene-α-olefin copolymer consisting of at least 70 wt % of propylene and at most 30 wt % of α-olefin, based on the total weight of the propylene-based matrix and wherein the propylene-based matrix is present in an amount of 60 to 95 wt % based on the total heterophasic propylene copolymer and (b) a dispersed ethylene-α-olefin copolymer, wherein the dispersed ethylene-α-olefin copolymer is present in an amount of 40 to 5 wt % based on the total heterophasic propylene copolymer and wherein the sum of the total amount of propylene-based matrix and total amount of the dispersed ethylene-α-olefin copolymer in the heterophasic propylene copolymer is 100 wt % with respect to the heterophasic propylene copolymer.

The propylene-based matrix consists of a propylene homopolymer and/or a propylene-α-olefin copolymer consisting of at least 70 wt % of propylene and up to 30 wt % of α-olefin, for example ethylene, for example consisting of at least 80 wt % of propylene and up to 20 wt % of α-olefin, for example consisting of at least 90 wt % of propylene and up to 10 wt % of α-olefin, based on the total weight of the propylene-based matrix.

Preferably, the α-olefin in the propylene-α-olefin copolymer is selected from the group of α-olefins having 2 or 4 to 10 carbon atoms, for example ethylene, 1-butene, 1-pentene, 4-methyl-1-pentene, 1-hexen, 1-heptene or 1-octene, and is preferably ethylene.

Preferably, the propylene-based matrix consists of a propylene homopolymer. When the propylene-based matrix consists of a propylene homopolymer, a higher stiffness is obtained compared to the case where the propylene-based matrix is a propylene-α-olefin copolymer, which may be advantageous.

The melt flow index (MFI) of the propylene-based matrix (before the heterophasic propylene copolymer is mixed into the composition of the invention), $MFI_{PP}$, may be for example at least 0.1 dg/min, at least 0.2 dg/min, at least 0.3 dg/min, at least 0.5 dg/min, at least 1 dg/min, at least 1.5 dg/min, and/or for example at most 50 dg/min, at most 40 dg/min, at most 30 dg/min, at most 25 dg/min, at most 20 dg/min, measured according to ISO1133 (2.16 kg/230° C.). The $MFI_{PP}$ may be in the range of for example 0.1 to 50 dg/min, for example from 0.2 to 40 dg/min, for example 0.3 to 30 dg/min, for example 0.5 to 25 dg/min, for example from 1 to 20 dg/min, for example from 1.5 to 10 dg/min, measured according to ISO1133 (2.16 kg/230° C.).

The propylene-based matrix is present in an amount of 60 to 95 wt %. Preferably, the propylene-based matrix is present in an amount of 60 to 80 wt %, for example at least 65 wt % or at least 70 wt % and/or at most 78 wt %, based on the total heterophasic propylene copolymer.

The propylene-based matrix is preferably semi-crystalline, that is it is not 100% amorphous, nor is it 100% crystalline. For example, the propylene-based matrix is at least 40% crystalline, for example at least 50%, for example at least 60% crystalline and/or for example at most 80% crystalline, for example at most 70% crystalline. For example, the propylene-based matrix has a crystallinity of 60 to 70%. For purpose of the invention, the degree of crystallinity of the propylene-based matrix is measured using differential scanning calorimetry (DSC) according to ISO11357-1 and ISO11357-3 of 1997, using a scan rate of 10° C./min, a sample of 5 mg and the second heating curve using as a theoretical standard for a 100% crystalline material 207.1 J/g.

Besides the propylene-based matrix, the heterophasic propylene copolymer also comprises a dispersed ethylene-α-olefin copolymer. The dispersed ethylene-α-olefin copolymer is also referred to herein as the 'dispersed phase'. The dispersed phase is embedded in the heterophasic propylene copolymer in a discontinuous form. The particle size of the dispersed phase is typically in the range of 0.05 to 2.0 microns, as may be determined by transmission electron microscopy (TEM). The amount of the dispersed ethylene-α-olefin copolymer in the heterophasic propylene copolymer may herein be sometimes referred as RC.

In some preferred heterophasic propylene copolymers, the amount of ethylene in the ethylene-α-olefin copolymer is in the range of 20 to 65 wt %, for example at least 30 wt %, at least 35 wt %, at least 40 wt % or at least 45 wt %, and/or at most 60 wt % or at most 55 wt %. The amount of ethylene in the dispersed ethylene-α-olefin copolymer in the heterophasic propylene copolymer may herein be sometimes referred as RCC2.

The α-olefin in the ethylene-α-olefin copolymer is preferably chosen from the group of α-olefins having 3 to 8 carbon atoms. Examples of suitable α-olefins having 3 to 8 carbon atoms include but are not limited to propylene, 1-butene, 1-pentene, 4-methyl-1-pentene, 1-hexene, 1-heptene and 1-octene. More preferably, the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer.

The MFI of the dispersed ethylene α-olefin copolymer (before the heterophasic propylene copolymer is mixed into the composition of the invention), $MFI_{EPR}$, may be for example at least 0.001 dg/min, at least 0.01 dg/min, at least 0.1 dg/min, at least 0.3 dg/min, at least 0.7 dg/min, at least 1 dg/min, and/or for example at most 30 dg/min, at most 20 dg/min, at most 15 dg/min at most 10 dg/min, at most 5 dg/min or at most 3 dg/min. The $MFI_{EPR}$ may be in the range for example from 0.001 to 30 dg/min, for example from 0.01 to 20 dg/min, for example 0.1 to 15 dg/min, for example 0.3 to 10 dg/min, for example from 0.7 to 5 dg/min, for example from 1 to 3 dg/min. $MFI_{EPR}$ is calculated taking into account the MFI of the propylene-based matrix ($MFI_{PP}$) measured according to ISO1133 (2.16 kg/230° C.), the MFI of the heterophasic propylene copolymer (MFIheterophasic) measured according to ISO1133 (2.16 kg/230° C.) and the amount of the propylene-based matrix in the heterophasic propylene copolymer (matrix content) and the amount of the dispersed phase in the heterophasic propylene copolymer (rubber content (RC)) according to the following formula:

$$MFIEPR = 10^{\wedge}\left(\frac{\text{Log } MFIheterophasic - \text{matrix content} * \text{Log } MFIPP}{\text{rubber content}}\right)$$

The dispersed ethylene-α-olefin copolymer is present in an amount of 40 to 5 wt %. In some preferred heterophasic propylene copolymers, the dispersed ethylene-α-olefin copolymer is present in an amount of at least 10 wt %, for example at least 15 wt % or at least 17 wt %, and/or at most 35 wt %, for example at most 30 wt % or 25 wt %, based on the total heterophasic propylene copolymer.

In the heterophasic propylene copolymer in the composition of the invention, the sum of the total weight of the propylene-based matrix and the total weight of the dispersed ethylene-α-olefin copolymer is 100 wt % with respect to the heterophasic propylene copolymer.

Preferably, the heterophasic propylene copolymer has a fraction soluble in p-xylene at 25° C. (CXS) measured according to ISO 16152:2005 of 40 to 5 wt %. In some preferred heterophasic propylene copolymers, the heterophasic propylene copolymer has CXS of at least 10 wt %, for example at least 15 wt % or at least 17 wt %, and/or at most 35 wt %, for example at most 30 wt % or 25 wt %. In some preferred heterophasic propylene copolymers, the heterophasic propylene copolymer has CXS of 10 to 25 wt %. In some preferred heterophasic propylene copolymers, the heterophasic propylene copolymer has CXS of 25 to 40 wt %.

Preferably, the amount of ethylene in the heterophasic propylene copolymer (sometimes referred as TC2) is in the range of 3-20 wt % based on the heterophasic propylene copolymer. For example, the amount of ethylene in the heterophasic propylene copolymer may be at least 5 wt % or at least 7 wt % and/or at most 15 wt % or at most 13 wt %.

The MFI of some preferred heterophasic propylene copolymers may be for example at least 10 dg/min or at least 15 dg/min and/or at most 50 dg/min or at most 40 dg/min, measured according to ISO1133 (2.16 kg/230° C.). The MFI of some preferred heterophasic propylene copolymers may be for example at least 0.1 dg/min, at least 0.2 dg/min, at least 0.3 dg/min, at least 0.5 dg/min, at least 1 dg/min at least 1.5 dg/min, and/or for example at most 8 dg/min or at most 5 dg/min, measured according to ISO1133 (2.16 kg/230° C.).

The values of the MFI of the propylene-based matrix ($MFI_{PP}$) and the MFI of the dispersed ethylene-α-olefin elastomer ($MFI_{EPR}$) mentioned herein are understood as the values before the heterophasic propylene copolymer is mixed with component (B) and optional component(s) to obtain the composition according to the invention. The value of the MFI of the heterophasic propylene copolymer (MFI-heterophasic) refers to the final MFI of the heterophasic propylene copolymer. To exemplify this: In case the heterophasic propylene copolymer is not subjected to vis-breaking or shifting by melt-mixing with a peroxide, the MFIheterophasic is the original MFI value of the heterophasic propylene copolymer. In case the heterophasic propylene copolymer is subjected to vis-breaking or shifting by melt-mixing with a peroxide, the MFIheterophasic is the value of the heterophasic propylene copolymer after such vis-breaking or shifting.

Preferably, in the heterophasic propylene copolymer according to the invention, the α-olefin in the propylene-α-olefin copolymer is selected from the group of α-olefins having 2 or 4 to 10 carbon atoms and the α-olefin in the ethylene-α-olefin copolymer is selected from the group of α-olefins having 3 to 8 carbon atoms.

In some preferred embodiments, the propylene-based polymer is a mixture of heterophasic propylene copolymers, wherein the mixture comprises a heterophasic propylene copolymer having MFIheterophasic of 10 to 50 dg/min measured according to ISO1133 (2.16 kg/230° C.), preferably wherein the amount of the dispersed ethylene-α-olefin copolymer is 10 to 35 wt % based on the heterophasic propylene copolymer and preferably wherein the amount of ethylene in the ethylene-α-olefin copolymer is 30 to 55 wt % based on the ethylene-α-olefin copolymer. Preferably, the amount of such heterophasic propylene copolymer is 60 to 90 wt % of the total composition. Preferably, the mixture of the heterophasic propylene copolymers further comprises a heterophasic propylene copolymer having MFIheterophasic of 0.1 to 8 dg/min measured according to ISO1133 (2.16 kg/230° C.), preferably wherein the amount of the dispersed ethylene-α-olefin copolymer is 10 to 35 wt % wt % based on the heterophasic propylene copolymer and preferably wherein the amount of ethylene in the ethylene-α-olefin copolymer is 30 to 55 wt % based on the ethylene-α-olefin copolymer. Preferably, the amount of such heterophasic propylene copolymer is 5 to 10 wt % of the total composition.

The propylene-based polymer may also be a combination of any of the propylene-based polymer mentioned above, e.g. a mixture of a propylene homopolymer and a heterophasic propylene copolymer at a weight ratio of 1:99-99:1 or 50:50 or a mixture of a propylene homopolymer and a random propylene-ethylene copolymer at a weight ratio of 1:99-99:1 or 50:50.

(B) Solid Phase Phosphate Flame Retardant

The first flame retardant is in the form of particles comprising ammonium polyphosphate and at least one phosphate selected from the group consisting of melamine phosphate,
melamine polyphosphate,
melamine pyrophosphate,
piperazine phosphate,
piperazine polyphosphate,
piperazine pyrophosphate,
2-methylpiperazine monophosphate,
tricresyl phosphate,
alkyl phosphates,
haloalkyl phosphates,
tetraphenyl pyrophosphate,
poly(2-hydroxy propylene spirocyclic pentaerythritol bisphosphate),
poly(2,2-dimethylpropylene spirocyclic pentaerythritol bisphosphonate).

The amount of the first flame retardant is 15 to 40 wt %, for example at least 18 wt % or at least 20 wt % and/or for example at most 35 wt %, at most 30 wt % or at most 25 wt %, with respect to the total flame retardant composition.

Preferably, the first flame retardant has a normal particle size distribution (D50) of at least 8 microns as determined by Mastersizer 2000 available from Malvern.

Preferably, the amount of phosphate in the first flame retardant is 40-75 wt % as measured after treating with nitric acid using ICP-OES spectrometer (iCAP 6300 Duo available from Thermo Fisher)

Preferably, the first flame retardant comprises melamine phosphate.

Preferably, the first flame retardant further comprises zinc oxide.

Preferably, the amount of the ammonium polyphosphate in the first flame retardant is 5-15 wt %.

Preferably, the amount of the ammonium polyphosphate in the first flame retardant is 5-15 wt %,
the amount of melamine phosphate in the first flame retardant is 50-80 wt %,
the amount of piperazine phosphate in the first flame retardant is 10-25 wt % and
the amount of zinc oxide in the first flame retardant is 1-10 wt %.

(C) Phosphate Ester Flame Retardant

The amount of the aromatic phosphate ester flame retardant is 0.1 to 15 wt %, at least
with respect to the total flame retardant composition.

Preferably, the aromatic phosphate ester is selected from the group consisting of
resorcinol bis(diphenyl phosphate);
tetraphenyl resorcinol bis(diphenylphosphate);
bisphenol A bis(diphenyl phosphate);
bisphenol A diphosphate;
resorcinol bis(di-2,6-xylyl phosphate),
phosphoric acid, mixed esters with [1,1'-biphenyl]-4-4'-diol and phenol;
Phosphorictrichloride, polymer with 1,3-benzenediol, phenylester;
1,3-phenylene-tetrakis(2,6-dimethylphenyl)diphosphate;
isopropenylphenyl diphenyl phosphate;
4-phenylphenolformaldehyde phenylphosphonate;
tris(2,6-xylyl) phosphate;
Resorcinol bis(di-2,6-xylyl phosphate);
bisphenol S bis(diphenyl phosphate);
resorcinol-bisphenol A phenyl phosphates.

Preferably, the aromatic phosphate ester is added as a liquid.

Preferably, the aromatic phosphate ester is bisphenol A bis(diphenyl phosphate).

(D) Surface-Modified Fluorine Resin

Preferably, the composition according to the invention further comprises a fluorine resin with a surface modification. Preferably, the fluorine resin is polytetrafluoroethylene. Preferably, the surface-modification is styrene-acrylonitrile (SAN) styrene-acrylonitrile copolymer.

(E) Other Optional Components

The composition according to the invention may optionally comprise at least one optional component (E). Examples of optional components (E) are peroxides and other additives. The amount of the optional component (E) is typically 0 to 30 wt % of the total of the composition.

Peroxides

In some embodiments, the composition according to the invention can be obtained by melt-mixing a peroxide with components (A), (B) and (C) and optionally (D) and/or (E).

The composition obtained by the addition of a peroxide has a different (higher) MFI from the MFI of the propylene-based polymer (in particular heterophasic copolymer) used in preparing the composition. This step is also known in the art as vis-breaking or shifting. The term "visbreaking" is well known in the field of the invention. For example methods of visbreaking polypropylene have been disclosed in U.S. Pat. No. 4,282,076 and EP 0063654. It is also possible to first melt-mix a peroxide with component (A), which changes the melt flow index of the heterophasic propylene copolymer, and then mix with other components.

Examples of organic peroxides are well known and include dialkyl peroxides, e.g. dicumyl peroxides, peroxyketals, peroxycarbonates, diacyl peroxides, peroxyesters and peroxydicarbonates. Specific examples of these include benzoyl peroxide, dichlorobenzoyl peroxide, dicumyl peroxide, di-tert-butyl peroxide, 2,5-dimethyl-2,5-di(peroxybenzoato)-3-hexene, 1,4-bis(tert-butylperoxyisopropyl)benzene, lauroyl peroxide, tert-butyl peracetate, α,α'-bis(tert-butylperoxy)diisopropylbenzene (Luperco® 802), 2,5-dimethyl-2,5-di(tert-butylperoxy)-3-hexene, 2,5-dimethyl-2,5-di(tert-butylperoxy)-hexane, tert-butyl perbenzoate, tert-butyl perphenylacetate, tert-butyl per-sec-octoate, tert-butyl perpivalate, cumyl perpivalate.

It can easily be determined by the person skilled in the art through routine experimentation how much peroxide should be used to obtain a composition having the desired melt flow index. This also depends on the half-life of the peroxide and on the conditions used for the melt-mixing, which in turn depend on the exact composition of the heterophasic propylene copolymer.

When a peroxide is used, the amount of peroxide will typically lie in the range of 0.02 to 0.5 wt % based on the heterophasic propylene copolymer.

In some embodiments, the composition according to the invention is prepared without using a peroxide.

Additives

The composition according to the invention may further comprise additives. The additives may include nucleating agents, stabilisers, e.g. heat stabilisers, anti-oxidants, UV stabilizers; colorants, like pigments and dyes; clarifiers; surface tension modifiers; lubricants; flame-retardants; mould-release agents; flow improving agents; plasticizers; anti-static agents; external elastomeric impact modifiers; blowing agents; inorganic fillers such as talc and reinforcing agents; and/or components that enhance interfacial bonding between polymer and filler, such as a maleated polypropylene.

The skilled person can readily select any suitable combination of additives and additive amounts without undue experimentation. The amount of the additives depends on their type and function and typically is of from 0 to about 30 wt %. The amount of the additives may e.g. be from about 1 to about 20 wt %; from about 2 to about 10 wt % or of from 3 to about 5 wt % based on the total composition.

Composition

The sum of all components added in the process of the invention to form the composition comprising (A), (B), (C) and the optional components (D) and (E) should add up to 100% by weight of the total composition.

Preferably, the total of components (A), (B) and (C) is at least 70 wt %, at least 80 wt %, at least 90 wt %, at least 95 wt %, at least 97 wt %, at least 98 wt %, at least 99 wt %, at least 99.5 wt %, at least 99.9 wt % or 100 wt % of the total composition.

Process for Making Composition

The composition of the invention may be obtained by a process comprising melt-mixing (A), (B), (C) and optionally (D) and/or (E) by using any suitable means. Accordingly, the invention further relates to a process for the preparation of the composition according to the invention comprising melt mixing (A), (B), (C) and optionally (D) and/or (E).

Preferably, the composition of the invention is made in a form that allows easy processing into a shaped article in a subsequent step, like in pellet or granular form. The composition can be a mixture of different particles or pellets; like a blend of the heterophasic propylene copolymer and a masterbatch of additives. Preferably, the composition of the invention is in pellet or granular form as obtained by mixing all components in an apparatus like an extruder; the advantage being a composition with homogeneous and well-defined concentrations of the additives.

With melt-mixing is meant that the components (B) and (C) and optionally (D) and/or optionally (E) are mixed with (A) at a temperature that exceeds the melting point of (A).

Melt-mixing may be done using techniques known to the skilled person, for example in an extruder. Generally, in the process of the invention, melt-mixing is performed at a temperature in the range from 170-300° C.

Suitable conditions for melt-mixing, such as temperature, pressure, amount of shear, screw speed and screw design when an extruder is used are known to the skilled person.

When using an extruder, a conventional extruder such as a twin-screw extruder may be used. The temperature can vary through the different zones of the extruder as required. For example, the temperature may vary from 100° C. in the feed zone to 300° C. at the die. Preferably, the temperature in the extruder varies from 200 to 265° C.; lower temperatures may impede reactions between the peroxide and an optional co-agent, for example polyfunctional monomers such as BDDMA and, as a consequence, compositions with the desired melt flow index may not be obtained; too high temperatures may induce undesired degradation processes, which may for example result in compositions having poor mechanical properties. Likewise, the screw speed of the extruder may be varied as needed. Typical screw speed is in the range from about 100 rpm to about 400 rpm.

Properties of Composition

MFI

The MFI of the composition according to the invention may be in the range of for example 5 to 50 dg/min, for example from 7 to 40 dg/min, for example 10 to 30 dg/min, for example 15 to 35 dg/min, measured according to ISO1133 (2.16 kg/230° C.).

The MFI of the composition according to the invention may be 25 to 35 dg/min measured according to ISO1133 (2.16 kg/230° C.), wherein the polypropylene-based polymer is a propylene homopolymer or propylene α-olefin having an MFI of at least 10 dg/min, at least 20 dg/min. at least 30 dg/min or at least 40 dg/min and/or at most 100 dg/min, at most 80 dg/min, at most 60 dg/min or at most 50 dg/min measured according to ISO1133 (2.16 kg/230° C.).

The MFI of the composition according to the invention may be 10 to 25 dg/min measured according to ISO1133 (2.16 kg/230° C., wherein the mixture comprises a heterophasic propylene copolymer having MFIheterophasic of 10 to 50 dg/min measured according to ISO1133 (2.16 kg/230° C.) in an amount of 60 to 90 wt % of the total composition, preferably wherein the amount of the dispersed ethylene-α-olefin copolymer is 10 to 35 wt % based on the heterophasic propylene copolymer and preferably wherein the amount of ethylene in the ethylene-α-olefin copolymer is 30 to 55 wt % based on the ethylene-α-olefin copolymer.

Flame Retardancy

Preferably, the composition according to the invention has a flame retardancy of V0 according to the UL94 test standard at a sample thickness of 3 mm, wherein the sample was conditioned at 23° C. and 50 percent relative humidity for 48 hours prior to testing.

Preferably, the composition according to the invention has a flame retardancy of V0 according to the UL94 test standard at a sample thickness of 3 mm, wherein the sample was conditioned at 70° C. and 50 percent relative humidity for 168 hours prior to testing.

Preferably, the composition according to the invention has a flame retardancy of V0 according to the UL94 test standard at a sample thickness of 1.5 mm, wherein the sample was conditioned at 23° C. and 50 percent relative humidity for 48 hours prior to testing.

Preferably, the composition according to the invention has a flame retardancy of V0 according to the UL94 test standard at a sample thickness of 1.5 mm, wherein the sample was conditioned at 70° C. and 50 percent relative humidity for 168 hours prior to testing.

Preferably, the composition according to the invention has a flame retardancy of V0 according to the UL94 test standard at a sample thickness of 0.8 mm, wherein the sample was conditioned at 23° C. and 50 percent relative humidity for 48 hours prior to testing.

Preferably, the composition according to the invention has a flame retardancy of V0 according to the UL94 test standard at a sample thickness of 0.8 mm, wherein the sample was conditioned at 70° C. and 50 percent relative humidity for 168 hours prior to testing.

Charpy Impact Strength

Preferably, the composition according to the invention has a Charpy impact strength according to ISO 179 at 23° C. (test geometry: 80*10*4 mm) of at least 1 kJ/m2.

Stiffness (Flexural Modulus)

Preferably, the composition according to the invention has a flexural modulus according to ISO 178 (parallel; test geometry: 80*10*4 mm thickness) of at least 1000 MPa.

Further Aspects

The composition according to the invention may be processed by any conventional technique known in the art into an article. Suitable examples of processing techniques wherein the composition according to the invention may be used include injection moulding, injection blow moulding, injection stretch blow moulding, rotational moulding, compression moulding, extrusion, extrusion compression moulding, extrusion blow moulding, sheet extrusion, film extrusion, cast film extrusion, foam extrusion, thermoforming and thin-walled injection moulding.

The invention further relates to an article comprising the composition according to the invention. In particular, the invention relates to an article comprising the composition according to the invention, wherein the article is made by one of the processing techniques mentioned above. Injection moulding is widely used to produce articles such as for example caps and closures, batteries, pails, containers, external and internal parts in appliances, like printed circuit board holder, circuit breaker cover, drain pan in refrigerator, deflection coil of TV, stadium seats, automotive exterior parts like bumpers, automotive interior parts like instrument panels, or automotive parts under the bonnet. Extrusion is for example widely used to produce articles, such as rods, sheets, films and pipes. Thin wall injection moulding may for example be used to make thin wall packaging.

Preferably, the article according to the invention is caps and closures, batteries, pails, containers, external and internal parts in appliances, like printed circuit board holder, circuit breaker cover, drain pan in refrigerator, deflection coil of TV, stadium seats, automotive exterior parts like bumpers, automotive interior parts like instrument panels, or automotive parts under the bonnet.

The invention further relates to the use of the article comprising the composition according to the invention for caps and closures, batteries, pails, containers, automotive exterior parts like bumpers, automotive interior parts like instrument panels, or automotive parts under the bonnet.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

EXAMPLES

Materials as shown in Table 1 were used in the experiments.

TABLE 1

| | Description |
|---|---|
| Polypropylene 1 | PP Homopolymer, MFI 47 g/10 min |
| Flame retardant 1A | 50-60% piperazine pyrophosphate, 35-45% phosphoric acid compound, and 3-6% zinc oxide |

TABLE 1-continued

| | Description |
|---|---|
| Flame retardant 1B | 10-15% Ammonium polyphosphate, 60-70% Melamine phosphate, 15-20% phosphoric acid compound (not melamine phosphate), and 3-8% zinc oxide.) |
| Flame retardant 2 | Bisphenol A bis(diphenyl phosphate) |
| Anti-drip agent | Teflon (PTFE) encapsulated by Styrene-Ancrylonitrile copolymer |
| Polypropylene 2 | heterophasic propylene copolymer comprising a matrix phase of a propylene homopolymer and a dispersed phase of propylene-ethylene copolymer having MFI of 30 g/10 min, Dispersed phase (RC): 19.1 wt %, Ethylene in dispersed phase (RCC2): 47.2 wt %, Ethylene in heterophasic propylene copolymer (T2): 9 wt % |
| Polypropylene 3 | heterophasic propylene copolymer comprising a matrix phase of a propylene homopolymer and a dispersed phase of propylene-ethylene copolymer having MFI of 3 g/10 min, Dispersed phase (RC): 21.1 wt %, Ethylene in dispersed phase (RCC2): 52.1 wt %, Ethylene in heterophasic propylene copolymer (T2): 11 wt % |

Polypropylene was pre-mixed with other additives and the mixture was extruded using a twin-screw extruder to obtain pellets. The pellets were dried at 100° C. for 3 h and injection molded using FANUC injection molding machine (S-2000i) to prepare test specimens.

The MFI of the composition was measured according to ISO1133 (2.16 kg/230° C.).

The flame retardancy was measured according to the UL94 test standard at a sample thickness of 3 mm, 1.5 mm and 0.8 mm. The samples were conditioned at 23° C. and 50% relative humidity for 48 hours prior to testing or at 70° C. and 50% relative humidity for 168 hours. The sample bars were burnt at the gated end for Vx evaluation.

Charpy impact strength was measured according to ISO 179 at 23° C. by Toyoseiki Digital Impact DG-UB equipped with a pendulum of 2 J (test geometry: 80*10*4 mm).

The flexural modulus was measured according to ISO 178 (parallel; test geometry: 80*10*4 mm).

Results are summarized in Tables 2 and 3.

TABLE 2

| | Unit | #1 | #4 | #9 | #17 | #18 | #19 | #20 | #21 |
|---|---|---|---|---|---|---|---|---|---|
| Polypropylene 1 | wt % | 76.9 | 76.6 | 76.6 | 79.6 | 78.6 | 77.6 | 76.6 | 74.6 |
| Flame retardant 1A | wt % | 23 | 23 | | | | | | |
| Flame retardant 1B | wt % | | | 23 | 20 | 20 | 20 | 20 | 20 |
| Flame retardant 2 | wt % | | | | | 1 | 2 | 3 | 5 |
| T-SAN | wt % | | 0.3 | 0.3 | 0.3 | 0.3 | 0.3 | 0.3 | 0.3 |
| antioxidant 1 | wt % | 0.05 | 0.05 | 0.05 | 0.05 | 0.05 | 0.05 | 0.05 | 0.05 |
| antioxidant 2 | wt % | 0.05 | 0.05 | 0.05 | 0.05 | 0.05 | 0.05 | 0.05 | 0.05 |
| MFI | g/10 min | 24.42 | 17.27 | 28.62 | 30.71 | 30.76 | 26.66 | 26.91 | 26.69 |
| FR (3 mm) 23° C., 48 h | | V0 | V0 | V0 | V0 | V0 | V0 | V0 | V0 |

TABLE 2-continued

| | Unit | #1 | #4 | #9 | #17 | #18 | #19 | #20 | #21 |
|---|---|---|---|---|---|---|---|---|---|
| FR (3 mm) 70° C., 168 h | | V0 | V0 | V0 | V0 | V0 | V0 | V0 | V0 |
| FR (1.5 mm) 23° C., 48 h | | V2 | V0 | V0 | V2 | V0 | V0 | V0 | V0 |
| FR (1.5 mm) 70° C., 168 h | | V2 | V0 | V0 | V2 | V1 | V0 | V0 | V0 |
| FR (0.8 mm) 23° C., 48 h | | | | | F | F | V1 | V0 | V0 |
| FR (0.8 mm) 70° C., 168 h | | | | | F | F | V0 | V0 | V0 |
| Charpy impact | kJ/m2 | 1.27 | 1.22 | 1.27 | 1.28 | 1.75 | 1.31 | 1.54 | 1.37 |
| Flex modulus | Mpa | 2275.53 | 2355.44 | 2073.46 | 2036 | 2010 | 2028 | 1950 | 1912 |

In Table 2, the propylene-based polymer is a propylene homopolymer.

From the comparison of #4 and #9, it can be understood that the use of the FR 1B results in a much higher MFI compared to when the FR 1A is used, which leads to a better processability. The use of FR 1B also results in a lower flexural modulus compared to when FR 1A is used.

From the comparison of #17-#21, it can be understood that the use of FR 2 in combination with FR 1B results in a better flame retardancy. A higher amount of FR 2 results in a better flame retardancy. When the amount of FR 2 is too high, the flexural modulus decreases.

TABLE 3

| | Unit | #27 | #28 | #32 |
|---|---|---|---|---|
| Polypropylene 2 | wt % | 73 | 72 | 73 |
| Polypropylene 3 | wt % | 6.63 | 5.63 | 6.63 |
| Flame retardant 1B | wt % | 20 | 20 | 18 |
| Flame retardant 2 | wt % | | 2 | 2 |
| T-SAN | wt % | 0.25 | 0.25 | 0.25 |
| antioxidant 1 | wt % | 0.06 | 0.06 | 0.06 |
| antioxidant 2 | wt % | 0.06 | 0.06 | 0.06 |
| MFR | g/10 min | 16.8 | 19.1 | 17 |
| FR (3 mm) 23° C., 48 h | | V0 | V0 | V0 |
| FR (3 mm) 70° C., 168 h | | V0 | V0 | V0 |
| FR (1.5 mm) 23° C., 48 h | | V1 | V0 | V1 |
| FR (1.5 mm) 70° C., 168 h | | V1 | V1 | V1 |
| Charpy impact | kJ/m2 | 3.1 | 2.88 | 4 |
| Flex modulus | Mpa | 1708 | 1662 | 1574 |

In Table 3, the propylene-based polymer is a mixture of two types of heterophasic propylene copolymer.

From the comparison of #27 and #28, it can be understood that the use of FR 2 in combination with FR 1B results in a better flame retardancy.

From the comparison of #27 and #32, 2% it can be understood that replacing part of FR1B with the same amount of FR2 can maintain the flame retardancy while improving the impact strength.

The invention claimed is:

1. A flame retardant polypropylene composition comprising
(A) a polypropylene-based polymer,
(B) a first flame retardant in an amount of 15 to 40 wt % based on a total weight of the flame retardant polypropylene composition, wherein the first flame retardant is in the form of particles comprising, based on a total weight of the first flame retardant:
5-15 wt % ammonium polyphosphate,
50-80 wt % melamine phosphate,
10-25 wt % piperazine phosphate,
and
1-10 wt % zinc oxide, and
(C) a second flame retardant in an amount of 0.1 to 15 wt % based on a total weight of the flame retardant polypropylene composition, wherein the second flame retardant comprises an aromatic phosphate ester.

2. The composition according to claim 1, wherein the polypropylene-based polymer is a propylene homopolymer or a propylene-α-olefin copolymer consist of at least 70 wt % of propylene and up to 30 wt % of α-olefin based on the total weight of the copolymer, wherein the α-olefin is selected from the group of α-olefins having 2 or 4-10 carbon atoms.

3. The composition according to claim 1, wherein the polypropylene-based polymer is a heterophasic propylene copolymer consisting of
(a) a propylene-based matrix,
wherein the propylene-based matrix consists of a propylene homopolymer and/or a propylene-α-olefin copolymer consisting of at least 70 wt % of propylene and at most 30 wt % of α-olefin, based on the total weight of the propylene-based matrix, and
wherein the propylene-based matrix is present in an amount of 60 to 95 wt % based on the total heterophasic propylene copolymer, and
(b) a dispersed ethylene-α-olefin copolymer,
wherein the dispersed ethylene-α-olefin copolymer is present in an amount of 40 to 5 wt % based on the total heterophasic propylene copolymer, and
wherein the sum of the total amount of propylene-based matrix and total amount of the dispersed ethylene-α-olefin copolymer in the heterophasic propylene copolymer is 100 wt %.

4. The composition of claim 1, wherein the first flame retardant has a normal particle size distribution (D50) of at least 8 microns as determined by Mastersizer 2000 available from Malvern.

5. The composition of claim 1, wherein the amount of phosphate in the first flame retardant is 40-75 wt % as measured after treating with nitric acid using ICP-OES spectrometer (iCAP 6300 Duo available from Thermo Fisher).

6. The composition of claim 1, wherein the aromatic phosphate ester is selected from the group consisting of
resorcinol bis(diphenyl phosphate);
tetraphenyl resorcinol bis(diphenylphosphate);
bisphenol A bis(diphenyl phosphate);
bisphenol A diphosphate;
resorcinol bis(di-2,6-xylyl phosphate),
phosphoric acid, mixed esters with [1,1'-biphenyl]-4-4'-diol and phenol;
Phosphorictrichloride, polymer with 1,3-benzenediol, phenylester;
1,3-phenylene-tetrakis(2,6-dimethylphenyl)diphosphate;
isopropenylphenyl diphenyl phosphate;
4-phenylphenolformaldehyde phenylphosphonate;
tris(2,6-xylyl) phosphate;
Resorcinol bis(di-2,6-xylyl phosphate);
bisphenol S bis(diphenyl phosphate);
resorcinol bisphenol A phenyl phosphates.

7. The composition of claim 1, wherein the composition further comprises a fluorine resin with a surface modification.

8. An article comprising the composition of claim 1.

9. The article according to claim 8, wherein the article is selected from the group consisting of caps and closures, batteries, pails, containers, external and internal parts in appliances, circuit breaker cover, drain pan in refrigerator, deflection coil of TV, stadium seats, automotive exterior parts, automotive interior parts, or automotive parts under the bonnet.

10. The composition of claim 7, wherein the fluorine resin is polytetrafluoroethylene and the surface modification is styrene-acrylonitrile copolymer.

11. The composition of claim 3, wherein the α-olefin in the propylene-α-olefin copolymer is selected from the group of α-olefins having 2 or 4 to 10 carbon atoms.

12. The composition of claim 11, wherein the α-olefin in the ethylene-α-olefin copolymer is selected from the group of α-olefins having 3 to 8 carbon atoms.

13. The composition of claim 1, wherein the polypropylene-based polymer is a propylene homopolymer.

14. The composition of claim 1, wherein the aromatic phosphate ester comprises Bisphenol A bis(diphenyl phosphate).

15. A process for the preparation of the composition according to claim 1, comprising melt mixing (A), (B), and (C) and optional components.

* * * * *